United States Patent [19]

Kitamoto et al.

[11] Patent Number: 4,666,773

[45] Date of Patent: May 19, 1987

[54] MAGNETIC RECORDING MEDIUM

[75] Inventors: Tatsuji Kitamoto; Goro Akashi, both of Odawara, Japan

[73] Assignee: Fuji Photo Film Co., Ltd., Minami-ashigara, Japan

[21] Appl. No.: 585,023

[22] Filed: Mar. 5, 1984

Related U.S. Application Data

[63] Continuation of Ser. No. 375,682, May 6, 1982, abandoned.

[30] Foreign Application Priority Data

May 7, 1981 [JP] Japan .................................. 56-67642

[51] Int. Cl.⁴ ............................................ H01F 10/02
[52] U.S. Cl. .................................. 428/332; 428/457; 428/694; 428/900
[58] Field of Search ............................ 427/127–132, 427/48; 428/694, 900, 332, 457

[56] References Cited

U.S. PATENT DOCUMENTS

| | | | |
|---|---|---|---|
| 3,859,129 | 1/1975 | Chen et al. | 427/48 |
| 4,237,506 | 12/1980 | Manly | 148/105 |
| 4,265,931 | 5/1981 | Tamai et al. | 427/48 |

Primary Examiner—Bernard D. Pianalto
Attorney, Agent, or Firm—Armstrong, Nikaido, Marmelstein & Kubovcik

[57] ABSTRACT

In a magnetic recording medium comprising a nonmagnetic support and a magnetic recording layer coated thereon in which ferromagnetic particles are dispersed in a binder, the ferromagnetic particles are given a magnetic anisotropy by a magnetic annealing treatment and the direction of the magnetic anisotropy is vertical mainly to the recording surface. Thus, the vertical magnetization recording is improved.

9 Claims, No Drawings

MAGNETIC RECORDING MEDIUM

This application is a continuation of application Ser. No. 375,682, filed May 6, 1982, now abandoned.

BACKGROUND OF THE INVENTION

1. Field of the Invention

This invention relates to a magnetic recording medium and more particularly, it is concerned with an improved magnetic recording medium having an S/N ratio increased in high density recording.

2. Description of the Prior Art

Up to the present time, various trials have been made to increase the recording density of a magnetic tape (relative speed of tape and head/maximum frequency of recording signal) from the requirements as to the high fidelity in audio cassettes and the low speed in small-sized video tape recorders. In these trials, for example, it is proposed to increase the coercive force of a magnetic layer, to increase simultaneously the residual magnetization and coercive force as in metallic cassettes or to arrange a magnetic layer with a high coercive force as an upper layer to increase the output at a high recording density with preventing the output at a low recording density from lowering.

Lately the thought of vertical magnetization recording has been introduced to use effectively the residual magnetization component in the vertical direction to the surface of a magnetic recording medium. It is said that according to this vertical magnetization recording, the recording density as defined above becomes high, the output decrease due to self-demagnetization (decrease of the residual magnetization by a self-demagnetization field acting in a direction to negative the self-magnetization between N and S poles formed by the self residual magnetization, which is increased wth the decrease of the distance between the N and S poles) is not so large if the recording wavelength is smaller than the thickness of a magnetic layer, and the high density recording is effective with a recording wavelength of 1-2 microns or less. As a medium for the vertical magnetization recording, there have been used at present materials capable of being readily magnetized in the vertical direction, such as sputtered film of Co-Cr alloy.

In magnetic recording media with magnetic layers of coating type, utilization of a slant or vertical magnetization component, not in parallel with the magnetic surface, has been proposed as described in, for example, U.S. Pat. Nos. 3,185,775 and 3,052,567 and Japanese Patent Publication No. 15203/1974. However, these methods have the drawbacks that the noise level is still high and the output is low.

SUMMARY OF THE INVENTION

It is an object of the present invention to provide a magnetic recording medium whereby the above described drawbacks of the prior art can be overcome.

It is another object of the present invention to provide a magnetic recording medium having a high S/N ratio in a high recording density.

It is a further object of the present invention to provide a magnetic tape with an increased output and a decreased noise level.

It is a still further object of the present invention to improve the vertical magnetization recording.

These objects can be attained by a magnetic recording medium comprising a non-magnetic support and a magnetic recording layer coated thereon in which ferromagnetic particles are dispersed in a binder, characterized in that the ferromagnetic particles are given a magnetic anisotropy by a magnetic annealing treatment and the direction of the magnetic anisotropy is vertical mainly to the recording surface.

DETAILED DESCRIPTION OF THE INVENTION

In the case of coating magnetic particles using a solvent, in general, the commonly used acicular magnetic particles with a large length/width ratio tend to fall down to be in parallel with the coated surface during drying and it is very difficult to stand them vertically to the surface.

The inventors have noticed that ferromagnetic particles are given a uniaxial anisotropy by magnetic annealing in addition to the shape anisotropy and used in such a manner that the direction of the magnetic anisotropy by magnetic annealing be vertical to the recording surface.

That is to say, the present invention provides a magnetic recording medium comprising a non-magnetic support and a magnetic recording layer coated thereon in which ferromagnetic particles are dispersed in a binder, characterized in that the ferromagnetic particles are given a magnetic anisotropy by a magnetic annealing treatment and the direction of the magnetic anisotropy is vertical mainly to the recording surface.

The magnetic anisotropy by magnetic annealing means a phenomenon a ferromagnetic substance is placed in a magnetic field at a high temperature and cooled gradually while applying the magnetic field thereto, whereby to give a monoaxial magnetic anisotropy in the direction of the applied magnetic field, as described in Soshin Chikakado: "Kyojiseitai no Butsuri (Physics of Ferromagnetic Substance)" page 254–267, published September, 1959 by Shokabo.

As a material capable of exhibiting a magnetic annealing effect, various materials are known such as ferrites, Fe-Co, Fe-Ni alloys and the like, and in particular, Co-doped ferrites show a more remarkable magnetic annealing effect. Those containing Co in a proportion of 0.3 to 30% have a higher coercive force in proportion to the content of Co and exhibit a magnetic annealing effect at a relatively low temperature, e.g. 200°–300° C. or less, whereby the magnetic anisotropy appears under ambient conditions at room temperature. In the magnetic annealing, Co-doped ferrites ranging from $Co_xFe_{(1-x)}^{++}Fe_2^{+++}O_4$ (x=0.003–0.6) to $Co_xFe_{(2-x)}^{++}O_{3-x/2}$ (x=0.005–0.4) by controlling $Fe^{++}$ have been proposed in which a part of Co, $Fe^{++}$ and $Fe^{+++}$ can be replaced by other metals such as Mn, Cr and the like, and these ferrites can also be used in the present invention.

The size of a particle to be subjected to a magnetic annealing treatment is preferably 2 microns or less and the shape thereof is not particularly limited. For the purpose of improving the S/N ratio in a high recording density, however, the particle size is preferably 0.3 micron or less and the shape thereof is preferably oval to cubic with a length/width ratio of about 1.

The temperature and period of time for effecting a magnetic annealing treatment depend upon the amounts of Co, $Fe^{++}$ and other additives and the history of a product, but in general, they can respectively be determined experimentally so as to increase the squareness ratio (Br/Bm) of BH curve. In the ordinary use, e.g.

tapes often used at room temperature, it is desirable that the temperature for magnetic annealing is 50° to 300° C., since if lower than 50° C., the merit achieved by the magnetic annealing effect according to the present invention tends to be decreased with the passage of time.

Usually, the magnetic annealing treatment is carried out under powdered state and thereafter, the treated powder is dispersed in a binder, coated and then subjected to an orientation treatment in the vertical direction to the surface. However, the magnetic annealing treatment can be carried out while applying a magnetic field vertical to the surface of a magnetic recording medium after coated and dried.

The magnetic annealing treatment according to the present invention is preferably carried out under the following conditions:

(a) temperature: 50°–300° C.
(b) cooling speed: gradual, e.g. about 1° C./min
(c) strength of magnetic field: more than coercive force, e.g. at least 500 gauss
(d) time to hold temperature(a): 10 min–1 hr In the present invention, the magnetic orientation treatment of ferromagnetic particles in the vertical direction to a recording surface is effectively carried out in a DC magnetic field by a permanent magnet, electromagnet or solenoid optionally with supperposing an AC magnetic field or with using jointly aultrasonic wave.

The support member and binder used in the present invention should be made of materials capable of resisting a high temperature, in general, 100° to 300° C. required for a magnetic annealing treatment, when the magnetic annealing treatment is carried out after coating the magnetic layer.

Suitable binders which can be used in the present invention include hitherto known thermoplastic resins, thermosetting resins and mixtures thereof.

Suitable thermoplastic resins are those which have a softening point of about 150° C. or lower, a mean molecular weight of about 10,000 to 200,000 and a degree of polymerization of about 200 to 2,000, for example, vinyl chloride-vinyl acetate copolymers, vinyl chloride-vinylidene chloride copolymers, vinyl chloride-acrylonitrile copolymers, acrylate-acrylonitrile copolymers, acrylate-vinylidene chloride copolymers, acrylate-styrene copolymers, methacrylate-acrylonitrile copolymers, methacrylate-vinylidene chloride copolymers, methacrylate-styrene copolymers, urethane elastomers, polyvinyl fluoride, vinylidene chloride-acrylonitrile copolymers, butadiene-acrylonitrile copolymers, polyamide resins, polyvinyl butyral, cellulose derivatives such as cellulose acetate butyrate, cellulose diacetate, cellulose triacetate, cellulose propionate, cellulose nitrate and the like, styrene-butadiene copolymers, polyester resins, chlorovinyl ether-acrylate copolymers, amino resins, various synthetic rubber based thermoplastic resins and mixtures thereof. Examples of these resins are described in Japanese Patent Publication Nos. 6877/1962, 12528/1964, 19282/1964, 5349/1965, 20907/1965, 9463/1966, 14059/1966, 16985/1966, 6428/1967, 11621/1967, 4623/1968, 15206/1968, 2889/1969, 17947/1969, 18232/1969, 14020/1970, 14500/1970, 18573/1972, 22063/1972, 22064/1972, 22068/1972, 22069/1972, 22070/1972 and 27886/1973, U.S. Pat. Nos. 3,144,352, 3,419,420, 3,499,789, 3,713,887, etc.

Suitable thermosetting resins have a molecular weight of about 200,000 or less as a coating solution and when heated after coating and drying, the molecular weight becomes infinity due to reactions such as condensation, addition and the like. Of these resins, preferred resins are those which do not soften or melt before the resin thermally decomposes. Representative examples of these resins are phenol resins, epoxy resins, polyurethane hardening type resins, urea resins, melamine resins, alkyd resins, silicone resins, acryl based rective resins, epoxy-polyamide resins, mixtures of high molecular weight polyester resins and isocyanate prepolymers, mixtures of methacrylic acid salt copolymer and diisocyanate prepolymers, mixtures of polyester-polyols and polyisocyanates, ure-formaldehyde resins, mixtures of low molecular weight glycols, high molecular weight diols and triphenylmethane triisocyanates, polyamide resins and mixtures thereof, etc. Examples of these resins are described in, for example, Japanese Patent Publication Nos. 8103/1964, 9779/1965, 7192/1966, 8016/1966, 14275/1966, 18179/1967, 12081/1968, 28023/1969, 14501/1970, 24902/1970, 13103/1971, 22065/1972, 22066/1972, 22067/1972, 22072/1972, 22073/1972, 28045/1972, 28048/1972 and 28922/1972, U.S. Pat. Nos. 3,144,353, 3,320,090, 3,437,510, 3,597,273, 3,781,210 and 3,781,211, etc. These binders can be used individually or in combination with each other and other additives can be added to the binders. The mixing ratio by weight of a ferromagnetic powder and a binder is 10 to 400 parts by weight, preferably 30 to 200 parts by weight of the binder to 100 parts by weight of the ferromagnetic powder.

In addition to the above described binder and ferromagnetic fine powder, other additives such as dispersing agents, lubricants, abrasives, antistatic agents and the like can be added to the magnetic recording layer.

Suitable dispersing agents are fatty acid containing about 12 to 18 carbon atoms represented by the general formula $R_1COOH$ wherein $R_1$ is an alkyl group containing about 11 to 17 carbon atoms, for example, caprylic acid, capric acid, lauric acid, myristic acid, palmitic acid, stearic acid, oleic acid, elaidic acid, linolic acid, linolenic acid, stearolic acid and the like; metallic soaps comprising the alkali metal (Li, Na, K, etc.) salts or the alkaline earth metal (Mg, Ca, Ba, etc.) salts of the above described fatty acids; and lecithin, etc. In addition, higher alcohols containing about 12 or more carbon atoms and the sulfates thereof can be used. These dispersing agents are generally used in a proportion of about 1 to 20 parts by weight per 100 parts by weight of a binder. These dispersing agents are described in Japanese Patent Publication Nos. 28369/1964, 17945/1969 and 15001/1973 and U.S. Pat. Nos. 3,387,993 and 3,470,021.

Suitable lubricants which can be used in the present invention include silicone oils, carbon black, graphite, carbon black graft polymers, molybdenum disulfide, tungsten disulfide, fatty acid esters produced from a monocarboxylic acid containing about 12 to 16 carbon atoms and a monohydric alcohol containing about 3 to 12 carbon atoms, fatty acid estes produced from a monocarboxylic fatty acid containing about 17 or more carbon atoms and a monohydric alcohol in which the total number of carbon atoms ranges from about 21 to 23 and the like. These lubricants are generally used in a proportion of about 0.2 to 20 parts by weight per 100 parts by weight of a binder. These lubricants are described in Japanese Patent Publication No. 23889/1968, Japanese Patent Application Nos. 28647/1967 and 81543/1968, U.S. Pat. Nos. 3,470,021, 3,492,235, 3,497,411, 3,523,086, 3,625,760, 3,630,772, 3,634,253, 3,642,539 and 3,687,725, IMB Technical Disclosure Bulletin, Vol. 9, No. 7, page 779 (December 1966), and ELECTRONIK, No. 12, page 380 (1961), West Germany.

Typical abrasive agents which can be used in the present invention include fused alumina, silicon carbide, chromium oxide, corundum, diamond, synthetic diamond, garnet, emergy (main component: corundum and magnetite) and the like. These abrasive agents have generally a mean particle size of 0.05 to 5 microns, preferably 0.1 to 2 microns and are generally added in a proportion of 1 to 10 parts by weight to 100 parts by weight of the magnetic powder. Examples of the abrasives are described in Japanese Patent Application No. 26749/1973, U.S. Pat. Nos. 3,007,807, 3,041,196, 3,293,066, 3,630,910 and 3,687,725, British Pat. No. 1,145,349, West German Pat. Nos. 853,211 and 1,001,000.

Antistatic agents which can be used in the present invention include electrically conductive powders such as graphite, carbon black and carbon black graft polymers; natural surface active agents such as saponin; nonionic surface active agents such as alkylene oxide based, glycerol based and glycidol based surface active agents; cationic surface active agents such as heterocyclic compounds, e.g. higher alkylamines, quaternary ammonium salts, pyridine and the like; phosphoniums, sulfoniums and the like; anionic surface active agents containing acid groups such as carboxylic acid groups, sulfonic acid groups, phosphoric acid groups, sulfate groups, phosphate groups and the like; amphoteric surface active agents such as sulfates or phosphates of amino acids, amino sulfonic acids, amino alcohols and the like; etc.

Examples of the surface active agents which can be used as antistatic agents are described in U.S. Pat. Nos. 2,271,623, 2,240,472, 2,288,226, 2,676,122, 2,676,924, 2,676,975, 2,691,566, 2,727,860, 2,730,498, 2,742,379, 2,739,891, 3,068,101, 3,158,484, 3,201,253, 3,210,191, 3,297,540, 3,415,649, 3,441,413, 3,442,654, 3,475,174 and 3,545,974, West German Patent Applications (OLS) No. 1,942,665, British Pat. Nos. 1,077,317 and 1,498,450, Ryohei Oda et al., "Kaimen Kassei Zai no Gosei to so no Oyo (Synthesis of Surface Active Agents and Their Applications), Maki Shoten, Tokyo (1964), A. M. Schwrate et al., "Surface Active Agents", Interscience Publications Corp., New York (1958), J. P. Sisley et al., "Encyclopedia of Surface Active Agents", Vol. 2, Chemical Publishing Co., New York (1964), "Kaimen Kassei Zai Binran (Handbook of of Surface Active Agents)", 6th Ed., Sangyo Tosho Co., Tokyo (Dec. 20, 1966), etc.

These surface active agents can be used individually or in combination with each other. These surface active agents are generally used as antistatic agents, but in some cases, they are used for other purposes, for example, for improving dispersibility, magnetic properties and lubricity, or as an auxiliary coating agent.

Formation of a magnetic recording layer is carried out by dissolving or dispersing the above described composition in an organic solvent and then coating the resulting composition onto a support.

Suitable materials which can be used for this support are various plastics, for example, polyesters such as polyethylene terephthalate, polyethylene-2,6-naphthalate and the like, polyolefins such as polypropylene and the like, cellulose derivatives such as cellulose triacetate, cellulose diacetate and the like, polycarbonates, polyimides, etc., and non-magnetic metals, for example, copper, aluminum, zinc, etc. Such a non-magnetic support can have a thickness of about 3 to 100 microns, preferably 5 to 50 microns in the form of a film or sheet, and 0.5 to 10 mm in the form of a disk or card. A drum form can be used.

The above described magnetic powder, binder, dispersing agent, lubricant, abrasive agent, antistatic agent and solvent are well blended or kneaded to prepare a coating composition. For kneading, the magnetic powder and other components are charged in a kneading machine simultaneously or separately. For example, a magnetic powder is added to a solvent containing a dispersing agent, kneaded for a predetermined period of time, then mixed with other components and kneaded sufficiently to prepare a magnetic coating composition. Various kneading machines are used for the kneading and dispersing, for example, two roll mills, three roll mills, ball mills, pebble mills, trommel mills, sand grinders, Szegvari attritiers, high speed impeller dispersing machines, high speed stone mills, high speed impact mills, kneaders, high speed mixers, homogenizers, ultrasonic dispersing machines, etc. The kneading and dispersing techniques are described in T. C. Patton, "Paint Flow and Pigment Dispersion", published by John Wiley & Sons (1964) and U.S. Pat. Nos. 2,581,414 and 2,855,156.

The foregoing magnetic recording layer can be coated on a support using coating methods such as air doctor coating, blade coating, air knife coating, squeeze coating, dip coating, reverse roll coating, transfer roll coating, gravure coating, kiss coating, cast coating, spray coating and the like, and other coating methods can also be used. These methods are described in "Coating Kogaku (Coating Engineering)", page 253 to 277, published by Asakura Shoten, Tokyo (Mar. 20, 1972).

Typical organic solvents which can be used in the coating include ketones such as acetone, methyl ethyl ketone, methyl isobutyl ketone, cyclohexanone and the like; alcohols such as methanol, ethanol, propanol, butanol and the like; esters such as methyl acetate, ethyl acetate, butyl acetate, ethyl lactate, glycol monoethyl ether acetate and the like; ethers and glycol ethers such as diethyl ether, glycol monoethyl ether, glycol dimethyl ether, dioxane and the like; aromatic hydrocarbons such as benzene, toluene, xylene and the like; chlorinated hydrocarbons such as methylene chloride, ethylene chloride, carbon tetrachloride, chloroform, ethylene chlorohydrin, dichlorobenzene and the like; etc.

The thickness of the magnetic layer is preferably determined so that the thickness be approximately a recording wavelength and the self-demagnetization be prevented when there is a residual magnetization in the vertical direction and it is generally 0.1 to 10 microns, preferably 0.2 to 5 microns.

The present invention will be explained in detail with reference to the following examples. It will be obvious to those skilled in the art that various changes and modifications can be made in the components, ratios, operational order and the like without departing from the scope of the present invention. Therefore, the present invention should not be construed as being limited to the following examples.

EXAMPLE 1

266 parts by weight of ferrous sulfate and 14 parts by weight of cobalt sulfate were dissolved in 1000 parts by weight of water to prepare a solution M, 120 parts by weight of caustic soda was dissolved in 1500 parts by weight of water to prepare a solution A and 30 parts by weight of ammonium nitrate was dissolved in 100 parts by weight of water to prepare a solution OX.

The solutions M and A were heated at 40° C. To the solution A stirred were added the solution M and further the solution OX, and the temperature of the mixture was increased to 80° C. The reaction was continued for about 30 minutes to obtain a Co-containing magnetite powder, which was then subjected to a heat treatment at 200° C. in nitrogen atmosphere for 1 hour and treated at 200° C. in a magnetic field of 2000 gauss for 30 minutes, followed by cooling gradually at a rate of 1° C./min.

Using the thus resulting sample, a magnetic coating liquid I was prepared according to the following recipe:

|  | parts by weight |
| --- | --- |
| Ferromagnetic Iron Oxide subjected to Magnetic Annealing Treatment | 100 |
| Vinyl Chloride-Vinyl Acetate Copolymer | 27 |
| Acrylic Resin | 7 |
| Carbon Black | 8 |
| Silicone Oil | 1 |
| Amyl Stearate | 0.2 |
| Methyl Ethyl Ketone | 180 |

This magnetic coating liquid I was ball milled and well dispersed, coated onto a polyethylene terephthalate base of 22μ to give a coating thickness of 5μ dry base and passed through between poles forming a magnetic field of 800 gauss in the vertical direction, where the coated film was substantially dried by hot aie, thus obtaining Sample No. 1.

For comparison, a magnetic coating liquid I' was prepared by the use of an acicular γ-Fe$_2$O$_3$ having a length of 0.5μ and a length/width ratio of 12, which coercive force was adjusted by doping with Co, in place of the magnetic substance in the magnetic coating liquid I, coated onto a polyethylene terephthalate base with a thickness of 22μ to give a coating thickness of 5μ on dry base and then oriented in the longitudinal direction as in the ordinary tape, thus obtaining Sample No. 2.

These samples were subjected to a calendering treatment, slit in a width of ½" and subjected to measurement of the properties to obtain results as shown in Table 1.

In this table, Br/Bm ratio is a ratio of residual magnetic flux density to saturated magnetic flux density of BH curve measured in the vertical direction to the surface of a magnetic tape by means of a magnetic flux meter of sample vibration type (made by Toei Kogyo Co.) and A and B are the reproducing outputs of a magnetic tape, A being the output at a short recording wavelength (relative speed of head and tape/signal frequency), i.e. 1μ and B being a ratio of the output of a signal (3 MHz) in A to the noise level at a point of 2 MHz apart by 1 MHz from this signal. A and B are respectively represented by dB unit.

TABLE 1

| Sample No. | Coating Liquid | Br/Bm | A | B |
| --- | --- | --- | --- | --- |
| 1 | Magnetic Coating Liquid I | 0.40 | +5.5 | +5 |
| 2 (control) | Magnetic Coating Liquid I' | 0.32 | 0 | 0 |

As is evident from Table 1, Sample No. 1 subjected to magnetic annealing and orientation treatment in the vertical direction to the recording surface according to the present invention is superior to Sample No. 2 free from such a treatment.

EXAMPLE 2

A magnetic coating liquid II having the following composition was prepared and coated onto a support of polyimide film (Kapton-commercial name-) with a thickness of 23μ:

|  | parts by weight |
| --- | --- |
| Ferromagnetic Iron Oxide | 100 |
| Polyamideimide Resin (Pyrodic No. 100 -commercial name- made by Dainippon Ink Kagaku Kogyo Co.) | 130 |
| Graphite | 10 |
| Dimethylacetamide | 200 |

As the ferromagnetic iron oxide, there were used magnetic powders (a) and (b), (a) being the same as used in Example 1 and subjected to the magnetic annealing treatment of Example 1 and (b) being the same as used in Example 1 but free from the magnetic annealing treatment.

These compositions were charged in a ball mill and adequately dispersed, coated onto a support of polyimide film (Kapton) to give a coating thickness of 5μ on dry base, oriented in the longitudinal direction in the surface and subjected to a calendering treatment.

After drying, these tapes were rolled up, and the rolls were held at 200° C. for 1 hour and cooled gradually at a cooling rate of 1° C./min while applying a magnetic field of 1000 gauss in the radius direction from the center of the roll, thus obtaining Sample Nos. 3 and 4 corresponding to the magnetic powders (a) and (b). In addition, Sample No. 5 was prepared corresponding to Sample No. 4 but being free from the magnetic annealing treatment after tape making. These samples were subjected to measurement of the properties in an analogous manner to Example 1 to thus obtain results as shown in Table 2:

TABLE 2

| Sample No. | Br/Bm | A | B |
| --- | --- | --- | --- |
| 3 | 0.55 | 6.5 | 6.5 |
| 4 | 0.55 | 7.5 | 6.5 |
| 5 | 0.4 | 3 | 2.5 |

It will clearly be understood that the output properties are improved by carrying out the magnetic annealing treatment after tape making.

In the above described Examples, cubic particles containing 5% of Co were used, but the similar results were obtained even by changing the amount of Co in a range of 0.2 to 20% to give a desired coercive force, by changing $(Fe^{++}+Co^{++})/(Fe^{+++}+Fe^{++}+Co^{++})$ ratio in a range of from 0.33 corresponding to magnetite to 0 corresponding to γ-Fe$_2$O$_3$ or by replacing a part of $(Fe^{++}+Co^{++})$ by Mn, Cr or other ions.

What is claimed is:

1. A magnetic recording medium comprising a nonmagnetic support and a magnetic recording layer coated thereon in which ferromagnetic particles are dispersed in a binder, characterized in that the ferrmagnetic particles are given a magnetic anisotropy by a magnetic annealing treatment and the direction of the magnetic anisotropy is vertical mainly to the recording surface, the ferromagnetic particles being ferrites, Fe-Co alloys and Fe-Ni alloys, and also being oval or cubic particles having a size of at most two microns and a length/width ratio of at most 2.

2. The magnetic recording medium of claim 1, wherein the ferrites contain Co in a proportion of 0.3 to 30%.

3. The magnetic recording medium of claim 1, wherein the ferrites are represented by $Co_xFe_{(1-x)}^{++}Fe_2^{+++}O_4$ (x=0.003-0.6) or $Co_xFe_{(2-x)}^{+++}O_{3-x/2}$ (x=0.005-0.4).

4. The magnetic recording medium of claim 1, wherein the magnetic annealing treatment is carried out under powdered state, followed by dispersing the powder in a binder, coating and subjecting to an orientating treatment in the vertical direction to the surface.

5. The magnetic recording medium of claim 1, wherein the magnetic annealing treatment is carried out while applying a magnetic field vertical to the surface of the magnetic recording medium after coated and dried.

6. The magnetic recording medium of claim 1, wherein the magnetic annealing treatment is carried out from a temperature of 100° to 300° C.

7. The magnetic recording medium of claim 1, wherein the orientation treatment is carried out in a magnetic field in the vertical direction to the surface.

8. The magnetic recording medium of claim 7, wherein the magnetic field is a DC field or AC field.

9. The magnetic recording medium of claim 7, wherein the magnetic field has a field strength of 500 to 5000 gauss.

* * * * *